US010764086B2

(12) United States Patent
Hao et al.

(10) Patent No.: US 10,764,086 B2
(45) Date of Patent: Sep. 1, 2020

(54) PACKET PROCESSING METHOD, RELATED APPARATUS, AND NVO3 NETWORK SYSTEM

(71) Applicant: Huawei Technologies Co., Ltd., Shenzhen (CN)

(72) Inventors: Weiguo Hao, Nanjing (CN); Yizhou Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 16/018,867

(22) Filed: Jun. 26, 2018

(65) Prior Publication Data

US 2018/0302242 A1 Oct. 18, 2018

Related U.S. Application Data

(63) Continuation of application No. PCT/CN2016/110468, filed on Dec. 16, 2016.

(30) Foreign Application Priority Data

Dec. 31, 2015 (CN) .......................... 2015 1 1030967

(51) Int. Cl.
*H04L 12/46* (2006.01)
*H04L 29/12* (2006.01)
(Continued)

(52) U.S. Cl.
CPC ...... *H04L 12/4641* (2013.01); *H04L 12/4633* (2013.01); *H04L 45/64* (2013.01);
(Continued)

(58) Field of Classification Search
CPC . H04L 12/4633; H04L 12/4641; H04L 45/64; H04L 45/745; H04L 61/103; H04L 61/6077; H04L 69/14
See application file for complete search history.

(56) References Cited

U.S. PATENT DOCUMENTS 9,544,219 B2 * 1/2017 Chong .................... H04L 45/02
9,602,430 B2 * 3/2017 Vobbilisetty ............ H04L 12/46
(Continued)

FOREIGN PATENT DOCUMENTS

| CN | 103685026 A | 3/2014 |
| CN | 104243269 A | 12/2014 |

(Continued)

OTHER PUBLICATIONS

Sarikaya et al.,"Central Directory Approach for Mapping VTEP IP Address to VM MAC/IP address in VXLAN-draft-sarikaya-nvo3-dhc-vxlan-centraldir-mapping-00.txt",Network Working Group Internet-Draft,(Feb. 14, 2014).

*Primary Examiner* — Dung B Huynh
(74) *Attorney, Agent, or Firm* — Leydig, Voit & Mayer, Ltd.

(57) ABSTRACT

The present disclosure provide a packet processing method, a related apparatus, and an NVO3 network system. A first NVE receives a first packet sent by a first CE, where the first packet includes a MAC address of the first CE and a VLAN ID; the first NVE determines a VNI of the first CE according to an inbound interface of the first packet and the VLAN ID; the first NVE performs NVO3 encapsulation on the first packet to obtain an NVO3 encapsulated first packet, where the NVO3 encapsulated first packet includes the VNI of the first CE, and a source IP address in an NVO3 header of the NVO3 encapsulated first packet is a first shared VTEP IP address shared by the first NVE and a second NVE; and the first NVE forwards the NVO3 encapsulated first packet to a remote NVE.

18 Claims, 6 Drawing Sheets

(51) Int. Cl.
   *H04L 29/06* (2006.01)
   *H04L 12/715* (2013.01)
   *H04L 12/741* (2013.01)
(52) U.S. Cl.
   CPC ........ *H04L 45/745* (2013.01); *H04L 61/6077* (2013.01); *H04L 69/14* (2013.01); *H04L 61/103* (2013.01)

(56) References Cited

U.S. PATENT DOCUMENTS

| | | | | |
|---|---|---|---|---|
| 9,800,471 | B2* | 10/2017 | Addanki | H04L 41/12 |
| 9,807,005 | B2* | 10/2017 | Guntaka | H04L 45/745 |
| 9,860,169 | B1* | 1/2018 | Ninan | H04L 45/74 |
| 9,948,472 | B2* | 4/2018 | Drake | H04L 45/16 |
| 10,097,372 | B2* | 10/2018 | Bhattacharya | H04L 45/745 |
| 10,142,129 | B1* | 11/2018 | Gupta | H04L 12/4641 |
| 10,355,879 | B2* | 7/2019 | Ray | H04L 12/4641 |
| 2004/0088389 | A1* | 5/2004 | Shah | H04L 12/4641 709/221 |
| 2013/0182604 | A1* | 7/2013 | Moreno | H04L 61/103 370/254 |
| 2013/0322453 | A1* | 12/2013 | Allan | H04L 12/4662 370/395.53 |
| 2014/0006585 | A1* | 1/2014 | Dunbar | H04L 41/00 709/223 |
| 2014/0086253 | A1* | 3/2014 | Yong | H04L 12/4633 370/395.53 |
| 2014/0195666 | A1* | 7/2014 | Dumitriu | H04L 12/4625 709/223 |
| 2014/0307744 | A1* | 10/2014 | Dunbar | H04L 45/44 370/401 |
| 2014/0369345 | A1* | 12/2014 | Yang | H04L 12/18 370/355 |
| 2015/0003463 | A1* | 1/2015 | Li | H04L 12/4641 370/395.53 |
| 2015/0055651 | A1* | 2/2015 | Shen | H04L 12/1854 370/390 |
| 2015/0058470 | A1* | 2/2015 | Duda | H04L 12/4633 709/224 |
| 2015/0063353 | A1* | 3/2015 | Kapadia | H04L 45/745 370/392 |
| 2015/0110111 | A1* | 4/2015 | Song | H04L 12/6418 370/392 |
| 2015/0117256 | A1* | 4/2015 | Sabaa | H04L 49/15 370/254 |
| 2015/0124821 | A1 | 5/2015 | Chu et al. | |
| 2015/0124823 | A1* | 5/2015 | Pani | H04L 12/18 370/392 |
| 2015/0124826 | A1* | 5/2015 | Edsall | H04L 12/4633 370/392 |
| 2015/0195178 | A1* | 7/2015 | Bhattacharya | H04L 45/745 718/1 |
| 2015/0271067 | A1* | 9/2015 | Li | H04L 45/50 370/392 |
| 2015/0281171 | A1* | 10/2015 | Xiao | H04L 47/70 709/225 |
| 2015/0333967 | A1* | 11/2015 | Addanki | H04L 41/12 370/392 |
| 2015/0334081 | A1* | 11/2015 | Eastlake, III | H04L 61/103 370/390 |
| 2015/0381494 | A1* | 12/2015 | Cherian | H04L 45/745 370/392 |
| 2016/0006655 | A1* | 1/2016 | Hyoudou | H04L 12/54 370/392 |
| 2016/0014241 | A1* | 1/2016 | Tai | H04L 12/4633 370/474 |
| 2016/0021015 | A1* | 1/2016 | Thoria | H04L 47/2483 370/235 |
| 2016/0036774 | A1* | 2/2016 | Chong | H04L 45/02 370/392 |
| 2016/0094366 | A1* | 3/2016 | Wang | H04L 12/4625 370/401 |
| 2016/0094440 | A1* | 3/2016 | Huang | H04L 45/74 370/392 |
| 2016/0099874 | A1* | 4/2016 | Hu | H04L 12/6418 370/236 |
| 2016/0119156 | A1* | 4/2016 | Drake | H04L 45/16 709/223 |
| 2016/0142220 | A1* | 5/2016 | Hao | H04L 12/18 370/390 |
| 2016/0274926 | A1* | 9/2016 | Narasimhamurthy | G06F 9/45558 |
| 2016/0285736 | A1 | 9/2016 | Gu | |
| 2016/0294769 | A1* | 10/2016 | Song | H04L 12/4641 |
| 2016/0359745 | A1* | 12/2016 | Hao | H04L 12/46 |
| 2017/0019331 | A1* | 1/2017 | Yong | H04L 45/64 |
| 2017/0026417 | A1* | 1/2017 | Ernnagan | H04L 63/20 |
| 2017/0041222 | A1* | 2/2017 | Hooda | H04L 45/66 |
| 2017/0063783 | A1* | 3/2017 | Yong | H04L 67/2814 |
| 2017/0078115 | A1* | 3/2017 | Zhou | H04L 12/6418 |
| 2017/0078198 | A1* | 3/2017 | Nellikar | H04L 45/745 |
| 2017/0085502 | A1* | 3/2017 | Biruduraju | H04L 12/4633 |
| 2017/0093834 | A1* | 3/2017 | Natu | H04L 45/745 |
| 2017/0141963 | A1* | 5/2017 | Chalapathy | H04L 41/12 |
| 2017/0317919 | A1* | 11/2017 | Fernando | H04L 41/0806 |
| 2018/0013674 | A1* | 1/2018 | Nainar | G06F 9/455 |
| 2018/0034665 | A1* | 2/2018 | Nguyen | H04L 12/4641 |
| 2018/0139123 | A1* | 5/2018 | Qiang | H04L 45/308 |
| 2018/0219773 | A1* | 8/2018 | Li | H04L 45/64 |

FOREIGN PATENT DOCUMENTS

| | | |
|---|---|---|
| CN | 104767666 A | 7/2015 |
| CN | 104869042 A | 8/2015 |
| CN | 105099847 A | 11/2015 |
| WO | 2015169206 A1 | 11/2015 |

* cited by examiner

PACKET PROCESSING METHOD, RELATED APPARATUS, AND NVO3 NETWORK SYSTEM

CROSS-REFERENCE TO RELATED APPLICATIONS

This application is a continuation of International Application No. PCT/CN2016/110468, filed on Dec. 16, 2016, which claims priority to Chinese Patent Application No. 201511030967.5, filed on Dec. 31, 2015 The disclosures of the aforementioned applications are hereby incorporated by reference in their entireties.

TECHNICAL FIELD

The present disclosure relates to the field of communications technologies, and specifically, to a packet processing method, a related apparatus, and an NVO3 network system.

BACKGROUND

Currently, a physical network can be virtualized by using network virtualization over layer 3 (NVO3) technology, so that a same physical network can be shared by different tenants, traffic of the tenants can be isolated, and Internet Protocol (IP) addresses of the tenants can be overlapped. Each tenant usually can use one or more virtual networks. Customer edges (CE) in each virtual network communicate with each other by using a layer 2 network, and CEs of different virtual subnets communicate with each other by using a layer 3 network.

In an NVO3 network, a remote network virtualization edge (NVE) usually learns, by using a control plane, a media access control (MAC) address of a CE that is connected to a local NVE. The Ethernet virtual private network (EVPN) protocol runs between NVEs. Each NVE learns a MAC address of a locally connected CE by using a data plane. The local NVE may notify the remote NVE of the locally learned MAC address of the CE by using the Border Gateway Protocol (BGP). After learning, from an NVO3 network side, the MAC address of the CE sent by the local NVE, the remote NVE establishes a correspondence between the MAC address and an interface in a MAC forwarding table. For a multihomed CE, that is, a CE that simultaneously accesses multiple local NVEs, the remote NVE needs to enable a MAC address of the CE to separately correspond to multiple interfaces. However, when the remote NVE is a virtual switch (vSwitch), this load sharing manner is not supported in many cases. In addition, when a local NVE accessed by the CE changes, for example, a fault occurs in an access link between the CE and the local NVE, the remote NVE needs to modify the correspondence between the MAC address of the CE and the interface in the MAC forwarding table. When there is a large quantity of remote NVEs, a burden of modifying the MAC forwarding table is heavy, and network scalability is seriously affected.

SUMMARY

Embodiments of the present disclosure provide a packet processing method, a related apparatus, and an NVO3 network system, so as to reduce a burden on a remote NVE of maintaining a MAC forwarding table, and enhance network scalability.

A first aspect of the embodiments of the present disclosure provides a packet processing method, applied to an NVO3 network system, where the NVO3 network system includes a first NVE, a second NVE, a remote NVE, and a first CE, the first CE is multihomed to the first NVE and the second NVE, and respective globally unique VTEP IP addresses and a first shared VTEP IP address are set for the first NVE and the second NVE; and the method includes:

sending, by the first CE, a first packet to the first NVE, where the first packet carries a MAC address of the first CE and a VLAN ID; determining, by the first NVE, a VNI of the first CE according to an inbound interface of the first packet and the VLAN ID; and performing NVO3 encapsulation on the first packet to obtain an NVO3 encapsulated first packet, where the NVO3 encapsulated first packet includes the VNI, and a source IP address is the first shared VTEP IP address; and forwarding, by the first NVE, the NVO3 encapsulated first packet to the remote NVE, and after decapsulating the NVO3 encapsulated first packet, establishing, by the remote NVE, a mapping relationship among the MAC address of the first CE, the VNI of the first CE, and the first shared VTEP IP address in a MAC forwarding table. Because the remote NVE can receive only one IP address corresponding to the first CE, the remote NVE may not perceive multihoming of the first CE, thereby reducing a burden on the remote NVE of maintaining the MAC forwarding table, and enhancing network scalability.

Optionally, the NVO3 network system further includes a third NVE, and the second NVE and the third NVE share a second shared VTEP IP address; and the method further includes:

sending, by the first CE, a second packet to the first NVE, where the second packet is a BUM packet; and replicating, by the first NVE, the second packet, performing NVO3 encapsulation on the second packet to obtain an NVO3 encapsulated second packet, and forwarding the NVO3 encapsulated second packet to the second NVE and the third NVE, where a source IP address in an NVO3 header of the NVO3 encapsulated second packet is the first shared VTEP IP address. An NVE that receives the NVO3 encapsulated second packet compares, according to a stored interface entry, the first shared VTEP IP address with a VTEP IP address corresponding to an interface of the NVE for connecting to a CE, and forwards the second packet obtained by decapsulation to a first interface, but does not forward the second packet obtained by decapsulation to a second interface. A VTEP IP address corresponding to the first interface is different from the first shared VTEP IP address, the first interface is in a designated forwarder DF state, and a VTEP IP address corresponding to the second interface is the same as the first shared VTEP IP address. Each interface entry includes an interface for connecting to a CE, a VTEP IP address corresponding to the interface, and a status of the interface, the status includes a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed. In this way, a loop can be prevented from being generated when local NVEs forward a BUM packet between each other.

Optionally, if the first NVE is further connected to a second CE, and a VTEP IP address corresponding to an interface for connecting to the second CE is the first shared VTEP IP address, the first NVE directly forwards the second packet to the second CE.

A second aspect of the embodiments of the present disclosure provides a packet processing apparatus, applied to an NVO3 network system, where the NVO3 network system includes the packet processing apparatus, a second NVE, a remote NVE, and a first CE, the first CE is multihomed to the packet processing apparatus and the second NVE, and respective globally unique VTEP IP addresses and a first shared VTEP IP address are set for the packet processing apparatus and the second NVE; and the apparatus includes:

a receiving module, configured to receive a first packet sent by the first CE, where the first packet includes a MAC address of the first CE and a VLAN ID;

a determining module, configured to determine a VNI of the first CE according to an inbound interface of the first packet and the VLAN ID;

an encapsulation module, configured to perform NVO3 encapsulation on the first packet to obtain an NVO3 encapsulated first packet, where the NVO3 encapsulated first packet includes the VNI of the first CE, and a source IP address is the first shared VTEP IP address; and a forwarding module, configured to forward the NVO3 encapsulated first packet to the remote NVE, where the NVO3 encapsulated first packet is used to instruct the remote NVE to establish a mapping relationship among the MAC address of the first CE, the VNI of the first CE, and the first shared VTEP IP address in a MAC forwarding table. This can reduce a burden on the remote NVE of maintaining the MAC forwarding table, and enhance network scalability.

Optionally, the receiving module is further configured to receive a second packet sent by the first CE, where the second packet is a BUM packet;

the encapsulation module is further configured to: replicate the second packet, and perform NVO3 encapsulation on the second packet to obtain an NVO3 encapsulated second packet; and the forwarding module is further configured to forward the NVO3 encapsulated second packet to the second NVE and the third NVE, where a source IP address in an NVO3 header of the NVO3 encapsulated second packet is the first shared VTEP IP address, and the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to an interface whose corresponding VTEP IP address is different from the first shared VTEP IP address and that is in a DF state, but not forward the second packet obtained by decapsulation to an interface whose corresponding VTEP IP address is the same as the first shared VTEP IP address. In this way, a loop can be prevented from being generated when local NVEs forward a BUM packet between each other.

Optionally, the forwarding module is further configured to forward the second packet to a second CE when the packet processing apparatus is further connected to the second CE, and a VTEP IP address corresponding to an interface for connecting to the second CE is the first shared VTEP IP address.

A third aspect of the embodiments of the present disclosure provides a packet processing method, applied to an NVO3 network system, where the NVO3 network system includes a first NVE, a second NVE, a remote NVE, and a first CE, the first CE is multihomed to the first NVE and the second NVE, and respective globally unique VTEP IP addresses and a first shared VTEP IP address are set for the first NVE and the second NVE; and the method includes:

receiving, by the remote NVE, an NVO3 encapsulated first packet forwarded by the first NVE, where the NVO3 encapsulated first packet includes a VNI of the first CE, a source IP address in an NVO3 header of the NVO3 encapsulated first packet is the first shared VTEP IP address, the first packet is sent to the first NVE by the first CE, the first packet includes a MAC address of the first CE and a VLAN ID, and the VNI of the first CE is determined by the first NVE according to an inbound interface of the first packet and the VLAN ID; and decapsulating, by the remote NVE, the NVO3 encapsulated first packet, and establishing a mapping relationship among the MAC address of the first CE, the VNI of the first CE, and the first shared VTEP IP address in a MAC forwarding table. Because the remote NVE can receive only one IP address corresponding to the CE, the remote NVE may not perceive multihoming of the CE, thereby reducing a burden on the remote NVE of maintaining the MAC forwarding table, and enhancing network scalability.

Optionally, the remote NVE and the second NVE share a second shared VTEP IP address, and the method further includes:

receiving, by the remote NVE, a BUM packet sent by a CE that is connected to the local side of the remote NVE, and performing NVO3 encapsulation on the BUM packet to obtain an NVO3 encapsulated BUM packet, where a source IP address in an NVO3 header of the NVO3 encapsulated BUM packet is the second shared VTEP IP address; and forwarding, by the remote NVE, the NVO3 encapsulated BUM packet to the first NVE and the second NVE, where the NVO3 encapsulated BUM packet is used to instruct an NVE that receives the NVO3 encapsulated BUM packet to compare, according to a stored interface entry, the first shared VTEP IP address with a VTEP IP address corresponding to an interface of the NVE for connecting to a CE, and forward the BUM packet obtained by decapsulation to an interface whose corresponding VTEP IP address is different from the first shared VTEP IP address and that is in a DF state, but not forward the BUM packet obtained by decapsulation to an interface whose corresponding VTEP IP address is the same as the first shared VTEP IP address. In this way, a CE that is connected to a local NVE can be prevented from repeatedly receiving the BUM packet forwarded by the remote NVE.

A fourth aspect of the embodiments of the present disclosure provides a packet processing apparatus, applied to an NVO3 network system, where the NVO3 network system includes a first NVE, a second NVE, the packet processing apparatus, and a first CE, the first CE is multihomed to the first NVE and the second NVE, and the first NVE and the second NVE share a first shared VTEP IP address; and the apparatus includes:

a receiving module, configured to receive an NVO3 encapsulated first packet forwarded by the first NVE, where the NVO3 encapsulated first packet includes a VNI of the first CE, a source IP address in an NVO3 header of the NVO3 encapsulated first packet is the first shared VTEP IP address, the first packet is sent to the first NVE by the first CE, the first packet includes a MAC address of the first CE and a VLAN ID, and the VNI of the first CE is determined by the first NVE according to an inbound interface of the first packet and the VLAN ID;

a processing module, configured to decapsulate the NVO3 encapsulated first packet; and an establishment module, configured to establish a mapping relationship among the MAC address of the first CE, the VNI of the first CE, and the first shared VTEP IP address in a MAC forwarding table. In this way, the remote NVE may not perceive multihoming of the CE, and the remote NVE does not need to modify the MAC forwarding table when a fault occurs in a multihomed link of the CE, thereby greatly reducing a burden on the remote NVE of maintaining the MAC forwarding table, and enhancing network scalability.

Optionally, the packet processing apparatus and the second NVE share a second shared VTEP IP address;

the receiving module is further configured to receive a BUM packet sent by a CE that is connected to the packet processing apparatus;

the processing module is further configured to perform NVO3 encapsulation on the BUM packet to obtain an NVO3 encapsulated BUM packet, where a source IP address in an NVO3 header of the NVO3 encapsulated BUM packet is the second shared VTEP IP address; and the packet processing apparatus further includes:

a forwarding module, configured to forward the NVO3 encapsulated BUM packet to the first NVE and the second NVE, where the NVO3 encapsulated BUM packet is used to instruct an NVE that receives the NVO3 encapsulated BUM packet to compare, according to a stored interface entry, the first shared VTEP IP address with a VTEP IP address corresponding to an interface of the NVE for connecting to a CE, and forward the BUM packet obtained by decapsulation to an interface whose corresponding VTEP IP address is different from the first shared VTEP IP address and that is in a DF state, but not forward the BUM packet obtained by decapsulation to an interface whose corresponding VTEP IP address is the same as the first shared VTEP IP address. In this way, a CE that is connected to a local NVE can be prevented from repeatedly receiving the BUM packet forwarded by the remote NVE.

A fifth aspect of the embodiments of the present disclosure provides an NVO3 network system, including a first NVE, a second NVE, a remote NVE, and a first CE, where the first CE is multihomed to the first NVE and the second NVE, and the first NVE and the second NVE share a first shared VTEP IP address;

the first NVE is configured to receive a first packet sent by the first CE, where the first packet includes a MAC address of the first CE and a VLAN ID;

the first NVE is further configured to: determine a VNI of the first CE according to an inbound interface of the first packet and the VLAN ID, and perform NVO3 encapsulation on the first packet to obtain an NVO3 encapsulated first packet, where the NVO3 encapsulated first packet includes the VNI of the first CE, and a source IP address in an NVO3 header of the NVO3 encapsulated first packet is the first shared VTEP IP address;

the first NVE is further configured to forward the NVO3 encapsulated first packet to the remote NVE; and the remote NVE is configured to: decapsulate the received NVO3 encapsulated first packet, and establish a mapping relationship among the MAC address of the first CE, the VNI of the first CE, and the first shared VTEP IP address in a MAC forwarding table. In this way, the MAC address of the CE does not jump on the remote NVE, and the remote NVE does not need to modify the MAC forwarding table when a fault occurs in a multihomed link of the CE, thereby greatly reducing a burden on the remote NVE of maintaining the MAC forwarding table, and enhancing network scalability.

Optionally, the first packet is a BUM packet, the system further includes a third NVE, and the second NVE and the third NVE share a second shared VTEP IP address;

the first NVE is further configured to receive a second packet sent by the first CE, where the second packet is a BUM packet; and the first NVE is further configured to: replicate the second packet, perform NVO3 encapsulation on the second packet to obtain an NVO3 encapsulated second packet, and forward the NVO3 encapsulated second packet to the second NVE and the third NVE, where a source IP address in an NVO3 header of the NVO3 encapsulated second packet is the first shared VTEP IP address, where the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to an interface whose corresponding VTEP IP address is different from the first shared VTEP IP address and that is in a DF state, but not forward the second packet obtained by decapsulation to an interface whose corresponding VTEP IP address is the same as the first shared VTEP IP address. In this way, a loop can be prevented from being generated when local NVEs forward a BUM packet between each other.

Optionally, the first NVE is further configured to forward the second packet to a second CE when the first NVE is further connected to the second CE, and a VTEP IP address corresponding to an interface for connecting to the second CE is the first shared VTEP IP address.

In the embodiments of the present disclosure, a CE sends a packet to a remote NVE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following describes the technical solutions in the embodiments of the present disclosure with reference to the accompanying drawings in the embodiments of the present disclosure.

Figure 1:
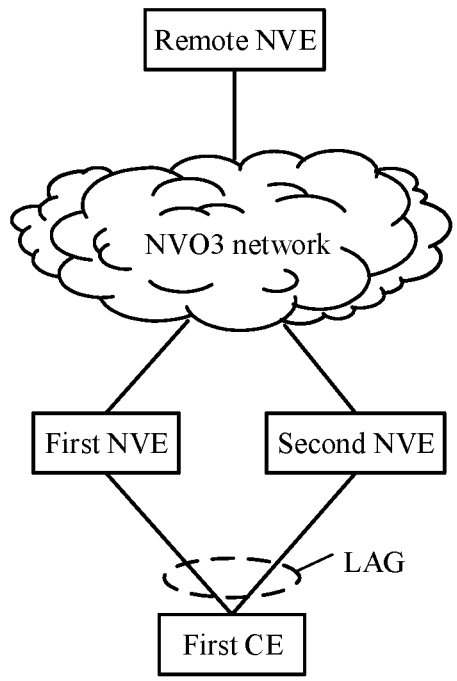
FIG. 1 is a schematic diagram of an NVO3 network architecture according to an embodiment of the present disclosure.

FIG. 1 is a schematic diagram of an NVO3 network architecture according to an embodiment of the present disclosure. The NVO3 network described in this embodiment includes a first CE, a first NVE, a second NVE, and a remote NVE. The first NVE and the second NVE serve as local NVEs. The first CE is multihomed to the first NVE and the second NVE. A link between the first CE and the first NVE and a link between the first CE and the second NVE are bundled into a link aggregation group (LAG). When sending a packet, the first CE selects one of the links by using the LAG, to send the packet to the first NVE or the second NVE. Any two of the first NVE, the second NVE, and the remote NVE are connected to each other by using a layer 3 network. The first CE is connected to the first NVE and the second NVE by using a layer 2 network. The CE in FIG. 1 may be specifically a virtual machine (VM), a tenant end system (TES), or may be a physical server, a switch, a firewall, or the like. The NVE may be located at a server or a physical network device, and responsible for packet forwarding, packet encapsulation, and packet decapsulation.

It should be noted that quantities of NVEs and CEs in an actual NVO3 network are not limited by the quantities shown in FIG. 1.

For each NVE, multiple VTEP IP addresses may be set, including a globally unique VTEP IP address and a VTEP IP address shared by the NVE and another NVE, which is referred to as a shared VTEP IP address in this specification. Each NVE may notify the another NVE of the globally unique VTEP IP address of the NVE and the shared VTEP IP address by using a routing protocol, so that the another NVE can access these VTEP IP addresses. If link costs from the another NVE to the first NVE are the same as those from the another NVE to the second NVE, load sharing may be performed for packets from the another NVE to the first NVE and the second NVE. For the first NVE and the second NVE in FIG. 1, it may be specified that the first NVE and the second NVE share a first shared VTEP IP address.

An interface of each NVE for connecting to a CE corresponds to an interface entry. Each interface entry includes an interface for connecting to a CE, a VTEP IP address corresponding to the interface, and a status of the interface, the status includes a designated forwarder (DF) state or a non-DF state, a VTEP IP address corresponding to an interface for connecting to a CE that is multihomed to multiple NVEs is a shared VTEP IP address of the NVEs to which the CE is multihomed, a VTEP IP address corresponding to an interface for connecting to a CE that is single-homed to an NVE is a globally unique VTEP IP address of the NVE to which the CE is single-homed, and the interface is in a DF state. For an interface in a DF state, an NVE forwards a packet received by using the interface, and for an interface in a non-DF state, an NVE discards a packet received by using the interface.

It should be noted that, for the single-homed CE, alternatively, the VTEP IP address corresponding to the interface may not be set in an interface entry of the interface for connecting to the CE, and the globally unique VTEP IP address of the connected NVE is used by default as the VTEP IP address corresponding to the interface.

Figure 2:
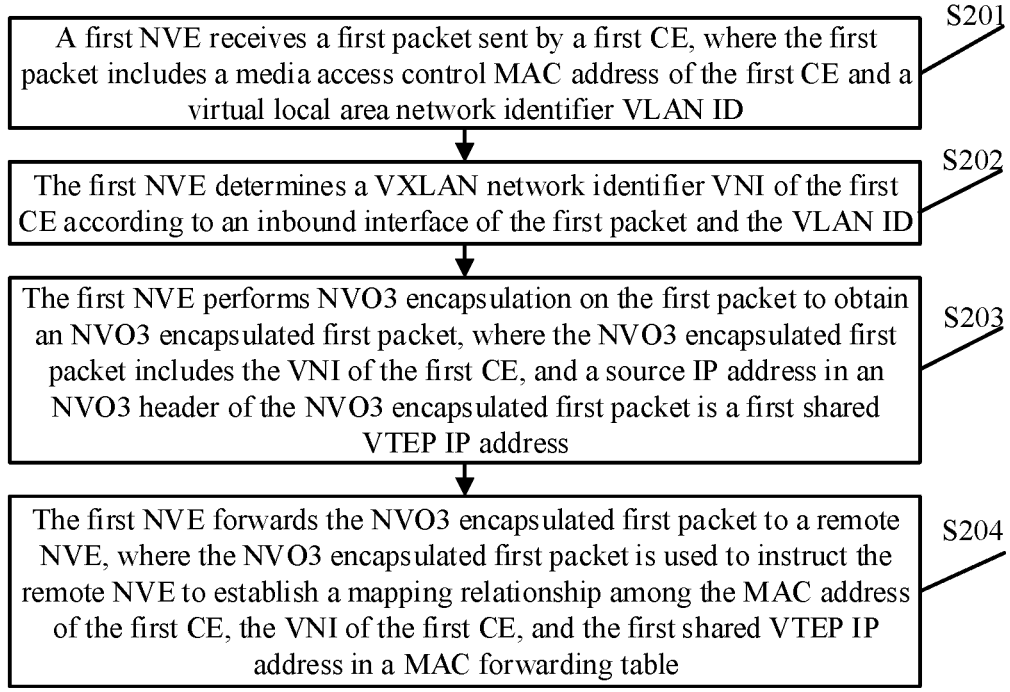
FIG. 2 is a schematic flowchart of a packet processing method according to an embodiment of the present disclosure.

FIG. 2 is a schematic flowchart of a packet processing method according to an embodiment of the present disclosure. The packet processing method described in this embodiment is applied to the NVO3 network architecture shown in FIG. 1. A first NVE and a second NVE serve as local NVEs, a first CE is multihomed to the first NVE and the second NVE, and the first NVE and the second NVE share a first shared VTEP IP address. The packet processing method includes the following steps.

S201. The first NVE receives a first packet sent by the first CE, where the first packet includes a media access control MAC address of the first CE and a virtual local area network identifier VLAN ID.

The first packet may be specifically a known unicast packet, or a broadcast, unknown unicast, and multicast (BUM) packet, and the first NVE may determine, according to a destination MAC address of the first packet, whether the first packet is a known unicast packet or a BUM packet.

Specifically, when sending the first packet, the first CE selects a transmit link from a LAG by using an equal-cost multi-path (ECMP) algorithm. If the first CE selects a link between the first CE and the first NVE as the transmit link, the first NVE receives the first packet.

An ECMP algorithm of a CE usually implements load sharing based on a 5-tuple of a packet, that is, performs a hash operation according to a source MAC address, a destination MAC address, a source IP address, a destination IP address, and a UDP/TCP protocol port number of the packet, so as to select one of physical links to send the packet.

S202. The first NVE determines a VXLAN network identifier VNI of the first CE according to an inbound interface of the first packet and the VLAN ID.

Specifically, the first NVE may determine the VNI of the first CE according to a correspondence among the interface, the VLAN ID, and the VNI; or determine the VNI of the first CE according to a correspondence between the MAC address and the VNI; or determine the VNI of the first CE according to a correspondence between the VLAN ID and the VNI; or determine the VNI of the first CE according to a correspondence between the interface and the VNI.

S203. The first NVE performs NVO3 encapsulation on the first packet to obtain an NVO3 encapsulated first packet, where the NVO3 encapsulated first packet includes the VNI of the first CE, and a source IP address in an NVO3 header of the NVO3 encapsulated first packet is the first shared VTEP IP address.

The NVO3 encapsulation may specifically include VXLAN encapsulation, Network Virtualization using Generic Routing Encapsulation (NVGRE) encapsulation, and the like.

Specifically, when the first NVE determines that the first packet is a known unicast packet, the first NVE obtains an outbound interface of the first packet by looking up a MAC forwarding table, and if the outbound interface is a local interface, the first NVE directly forwards the first packet by using the local interface. If the outbound interface is not a local interface, or when the first NVE determines that the first packet is a BUM packet, the first NVE performs NVO3 encapsulation on the first packet to obtain an NVO3 packet. The NVO3 packet includes the VNI of the first CE, and a source IP address in an NVO3 header of the NVO3 packet is the first shared VTEP IP address shared by the first NVE and the second NVE.

When NVO3 encapsulation is being performed on the first packet, the VLAN ID in the first packet may be reserved or deleted.

S204. The first NVE forwards the NVO3 encapsulated first packet to a remote NVE, where the NVO3 encapsulated first packet is used to instruct the remote NVE to establish a mapping relationship among the MAC address of the first CE, the VNI of the first CE, and the first shared VTEP IP address in a MAC forwarding table.

Specifically, the first NVE forwards the NVO3 packet to the remote NVE. The remote NVE decapsulates the NVO3 packet to obtain the MAC address of the first CE, the VNI of the first CE, and the first shared VTEP IP address, and establishes the mapping relationship among the MAC address of the first CE, the VNI of the first CE, and the first shared VTEP IP address in the MAC forwarding table, so that the remote NVE completes learning of the MAC address of the first CE in a data plane.

Further, if the first CE selects a link between the first CE and the second NVE as the transmit link, the second NVE receives the first packet. Likewise, when the outbound interface is not a local interface, or when the second NVE determines that the first packet is a BUM packet, the second NVE performs NVO3 encapsulation on the first packet to obtain an NVO3 packet. A source IP address in an NVO3 header of the NVO3 packet is the first shared VTEP IP address shared by the first NVE and the second NVE. When the first CE sends a packet by using the second NVE, the remote NVE also establishes the mapping relationship among the MAC address of the first CE, the VNI of the first CE, and the first shared VTEP IP address in the MAC forwarding table, and the remote NVE may not perceive that the first CE is multihomed to different NVEs. Therefore, when a fault occurs in a multihomed link of the first CE, the remote NVE does not need to modify the MAC forwarding table, and the MAC address of the first CE does not jump on the remote NVE.

In this embodiment of the present disclosure, a CE sends a packet to a remote NVE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

Figure 3:
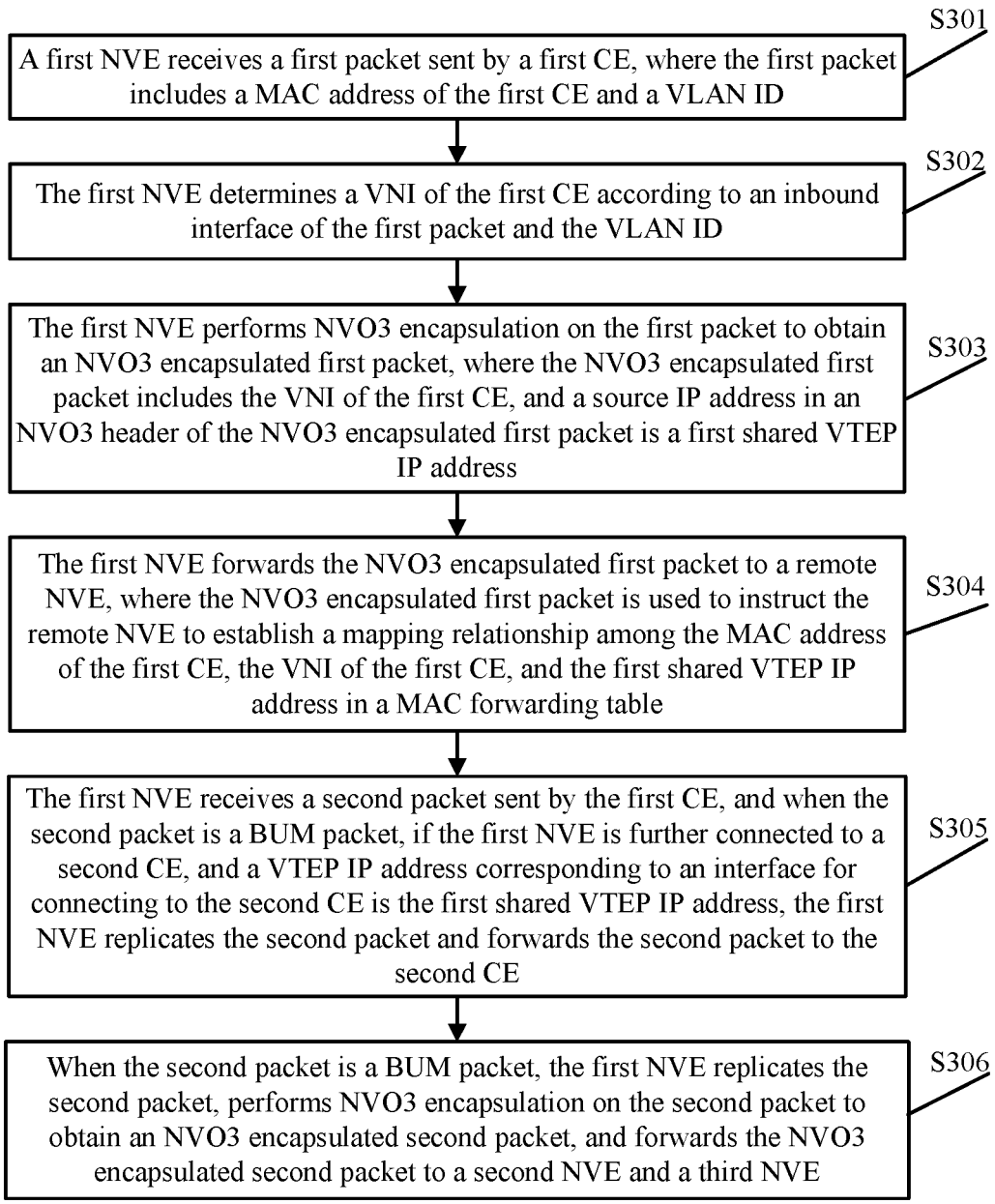
FIG. 3 is a schematic flowchart of another packet processing method according to an embodiment of the present disclosure.
Figure 4:
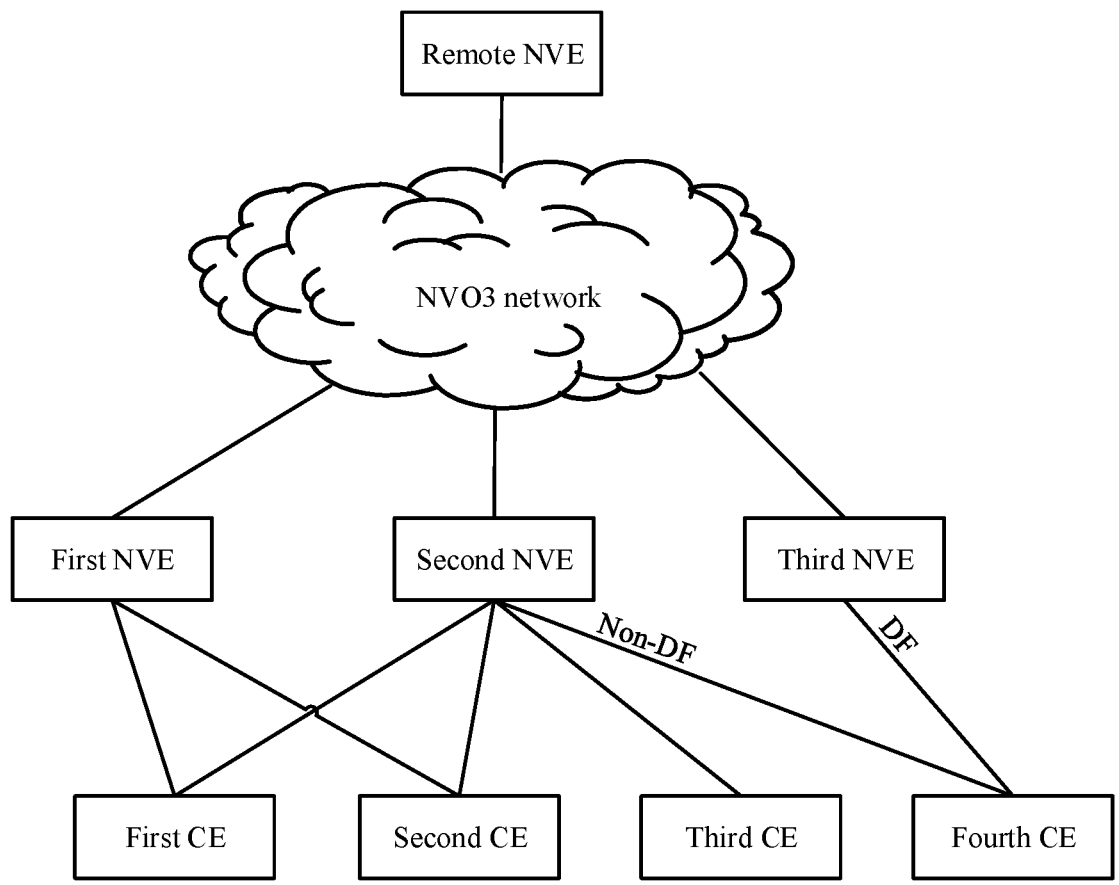
FIG. 4 is a schematic diagram of another NVO3 network architecture according to an embodiment of the present disclosure.

FIG. 3 is a schematic flowchart of another packet processing method according to an embodiment of the present disclosure. The packet processing method described in this embodiment is applied to an NVO3 network architecture shown in FIG. 4. A first NVE, a second NVE, and a third NVE serve as local NVEs, a first CE and a second CE are both multihomed to the first NVE and the second NVE, a third CE is single-homed to the second NVE, a fourth CE is multihomed to the second NVE and the third NVE, the first NVE and the second NVE share a first shared VTEP IP address, and the second NVE and the third NVE share a second shared VTEP IP address. The packet processing method includes the following steps.

Step S301 to step S304 are the same as step S201 to step S204 in the foregoing embodiment, and details are not described herein again in this embodiment of the present disclosure.

S305. The first NVE receives a second packet sent by the first CE, and when the second packet is a BUM packet, if the first NVE is further connected to the second CE, and a VTEP IP address corresponding to an interface for connecting to the second CE is the first shared VTEP IP address, the first NVE replicates the second packet and forwards the second packet to the second CE.

Specifically, when determining, according to a destination MAC address of the second packet, that the second packet is a BUM packet, the first NVE determines, according to a stored interface entry, whether a CE that corresponds to a same shared VTEP IP address (that is, the first shared VTEP IP address) as the first CE is further locally connected. When determining that the second CE corresponding to the first shared VTEP IP address exists, the first NVE replicates the second packet and directly forwards the second packet to the second CE.

S306. When the second packet is a BUM packet, the first NVE replicates the second packet, performs NVO3 encapsulation on the second packet to obtain an NVO3 encapsulated second packet, and forwards the NVO3 encapsulated second packet to the second NVE and the third NVE.

A source IP address in an NVO3 header of the NVO3 encapsulated second packet is the first shared VTEP IP address, and the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to a first interface, but not forward the second packet obtained by decapsulation to a second interface. A VTEP IP address corresponding to the first interface is different from the first shared VTEP IP address, the first interface is in a designated forwarder DF state, and a VTEP IP address corresponding to the second interface is the same as the first shared VTEP IP address.

VNIs of the first NVE, the second NVE, and the third NVE are the same.

Specifically, when determining, according to the destination MAC address of the second packet, that the second packet is a BUM packet, the first NVE performs NVO3 encapsulation on the second packet to obtain an NVO3 packet. Source IP addresses in NVO3 headers of NVO3 packets forwarded to the second NVE and the third NVE are both the first shared VTEP IP address, and destination IP addresses are respectively globally unique VTEP IP addresses of the second NVE and the third NVE. The second NVE decapsulates the received NVO3 packet to obtain the second packet, and obtains a corresponding VTEP IP address from an interface entry corresponding to each interface for connecting to a CE. An interface for connecting to the second CE corresponds to the first shared VTEP IP address, an interface for connecting to the third CE corresponds to the globally unique VTEP IP address of the second NVE, and an interface for connecting to the fourth CE corresponds to the second shared VTEP IP address. The second NVE separately compares the VTEP IP addresses corresponding to the interface for connecting to the second CE, the interface for connecting to the third CE, and the interface for connecting to the fourth CE with the first shared VTEP IP address, and when determining that the VTEP IP address corresponding to interface for connecting to the second CE is the same as the first shared VTEP IP address, the second NVE does not forward the second packet to the second CE. For the single-homed third CE, the second NVE forwards the second packet to the third CE when determining that the VTEP IP address corresponding to the interface for connecting to the third CE is different from the first shared VTEP IP address.

Further, if the second NVE determines that the VTEP IP address corresponding to the interface for connecting to the fourth CE is different from the first shared VTEP IP address, the second NVE and the third NVE may determine, by using the Border Gateway Protocol (BGP) and according to a stored interface entry, that an interface on the third NVE is an interface in a DF state. Assuming that the second NVE and the third NVE determine that the interface on the third NVE is in a DF state, the third NVE forwards the second packet to the fourth CE, but the second NVE does not forward the second packet to the fourth CE.

It should be noted that, for an interface corresponding to a single-homed CE, alternatively, an interface entry may not be set for an NVE, so that the NVE directly forwards a packet to the single-homed CE without performing VTEP IP address comparison.

In this embodiment of the present disclosure, a CE sends a packet to a remote NVE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

Further, for a BUM packet sent by a local CE and received by a local NVE, when the local NVE is further connected to a CE that corresponds to a same shared VTEP IP address as the local CE, the local NVE directly forwards the BUM packet to the CE, performs NVO3 encapsulation on the BUM packet to obtain an NVO3 packet, and forwards the NVO3 packet to another local NVE, where a source IP address in an NVO3 header of the NVO3 packet is the shared VTEP IP address. In this way, an NVE that receives the NVO3 packet compares, according to a stored interface entry, the shared VTEP IP address with a VTEP IP address corresponding to an interface of the NVE for connecting to a CE, and forwards the BUM packet obtained by decapsulation to an interface whose corresponding VTEP IP address is different from the shared VTEP IP address and that is in a DF state, but does not forward the BUM packet obtained by decapsulation to an interface whose corresponding VTEP IP address is the same as the shared VTEP IP address, so that a loop can be prevented from being generated when local NVEs forward a BUM packet between each other.

Figure 5:
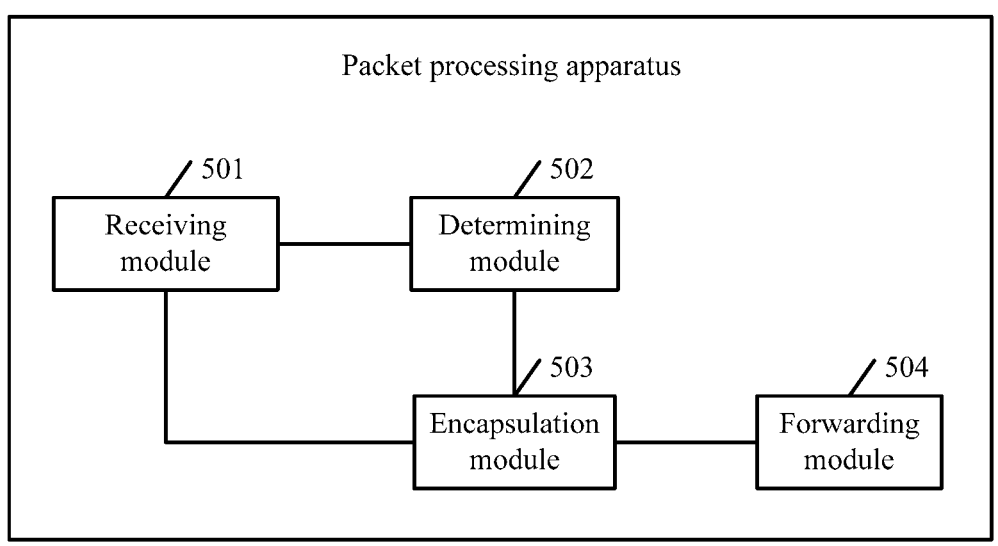
FIG. 5 is a schematic structural diagram of a packet processing apparatus according to an embodiment of the present disclosure.

FIG. 5 is a schematic structural diagram of a packet processing apparatus according to an embodiment of the present disclosure. The packet processing apparatus described in this embodiment is applied to the NVO3 network architecture shown in FIG. 4. The packet processing apparatus serves as a first NVE, the first NVE, a second NVE, and a third NVE serve as local NVEs, a first CE and a second CE are both multihomed to the first NVE and the second NVE, a third CE is single-homed to the second NVE, a fourth CE is multihomed to the second NVE and the third NVE, the first NVE and the second NVE share a first shared VTEP IP address, and the second NVE and the third NVE share a second shared VTEP IP address. The packet processing apparatus includes: a receiving module 501, a determining module 502, an encapsulation module 503, and a forwarding module 504.

The receiving module 501 is configured to receive a first packet sent by the first CE, where the first packet includes a MAC address of the first CE and a VLAN ID.

The determining module 502 is configured to determine a VNI of the first CE according to an inbound interface of the first packet and the VLAN ID.

Specifically, the determining module 502 may determine the VNI of the first CE according to a correspondence among the interface, the VLAN ID, and the VNI; or determine the VNI of the first CE according to a correspondence between the MAC address and the VNI; or determine the VNI of the first CE according to a correspondence between the VLAN ID and the VNI; or determine the VNI of the first CE according to a correspondence between the interface and the VNI.

The encapsulation module 503 is configured to perform NVO3 encapsulation on the first packet to obtain an NVO3 encapsulated first packet, where the NVO3 encapsulated first packet includes the VNI of the first CE, and a source IP address in an NVO3 header of the NVO3 encapsulated first packet is the first shared VTEP IP address.

The forwarding module 504 is configured to forward the NVO3 encapsulated first packet to the remote NVE, where the NVO3 encapsulated first packet is used to instruct the remote NVE to establish a mapping relationship among the MAC address of the first CE, the VNI of the first CE, and the first shared VTEP IP address in a MAC forwarding table.

Specifically, when determining that the first packet is a known unicast packet, the encapsulation module 503 obtains an outbound interface of the first packet by looking up the MAC forwarding table, and if the outbound interface is a local interface, the forwarding module 504 is instructed to directly forward the first packet by using the local interface. If the outbound interface is not a local interface, or when the encapsulation module 503 determines that the first packet is a BUM packet, the encapsulation module 503 performs NVO3 encapsulation on the first packet to obtain an NVO3 packet. The NVO3 packet includes the VNI of the first CE, and a source IP address in an NVO3 header of the NVO3 packet is the first shared VTEP IP address shared by the first NVE and the second NVE.

When the encapsulation module 503 performs NVO3 encapsulation on the first packet, the VLAN ID in the first packet may be reserved or deleted.

Further, the forwarding module 504 forwards the NVO3 packet to the remote NVE. The remote NVE decapsulates the NVO3 packet to obtain the MAC address of the first CE, the VNI of the first CE, and the first shared VTEP IP address, and establishes the mapping relationship among the MAC address of the first CE, the VNI of the first CE, and the first shared VTEP IP address in the MAC forwarding table, so that the remote NVE completes learning of the MAC address of the first CE in a data plane.

Further, if the first CE selects a link between the first CE and the second NVE as a transmit link, the second NVE receives the first packet. Likewise, when the outbound interface is not a local interface, or when the second NVE determines that the first packet is a BUM packet, the second NVE performs NVO3 encapsulation on the first packet to obtain an NVO3 packet. A source IP address in an NVO3 header of the NVO3 packet is the first shared VTEP IP address shared by the first NVE and the second NVE. When the first CE sends a packet by using the second NVE, the remote NVE also establishes the mapping relationship among the MAC address of the first CE, the VNI of the first CE, and the first shared VTEP IP address in the MAC forwarding table, and the remote NVE may not perceive that the first CE is multihomed to different NVEs. Therefore, when a fault occurs in a multihomed link of the first CE, the remote NVE does not need to modify the MAC forwarding table, and the MAC address of the first CE does not jump on the remote NVE.

In this embodiment of the present disclosure, a CE sends a packet to a remote NVE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

In some feasible implementations, the receiving module 501 is further configured to receive a second packet sent by the first CE, where the second packet is a BUM packet.

If the packet processing apparatus is further connected to the second CE, and a VTEP IP address corresponding to an interface for connecting to the second CE is the first shared VTEP IP address, the forwarding module 504 is further configured to replicate the second packet and forward the second packet to the second CE.

Specifically, when the encapsulation module 503 determines, according to a destination MAC address of the second packet, that the second packet is a BUM packet, the forwarding module 504 determines, according to a stored interface entry, whether a CE that corresponds to a same shared VTEP IP address (that is, the first shared VTEP IP address) as the first CE is further locally connected to the packet processing apparatus. When determining that the second CE corresponding to the first shared VTEP IP address exists, the first NVE replicates the second packet and directly forwards the second packet to the second CE.

The encapsulation module 503 is further configured to: replicate the second packet, and perform NVO3 encapsulation on the second packet to obtain an NVO3 encapsulated second packet.

The forwarding module 504 is further configured to forward the NVO3 encapsulated second packet to the second NVE and the third NVE, where a source IP address in an NVO3 header of the NVO3 encapsulated second packet is the first shared VTEP IP address.

The NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to a first interface, but not forward the second packet obtained by decapsulation to a second interface. A VTEP IP address corresponding to the first interface is different from the first shared VTEP IP address, the first interface is in a DF state, and a VTEP IP address corresponding to the second interface is the same as the first shared VTEP IP address.

In this embodiment of the present disclosure, for a BUM packet sent by a local CE and received by a local NVE, when the local NVE is further connected to a CE that corresponds to a same shared VTEP IP address as the local CE, the local NVE directly forwards the BUM packet to the CE, performs NVO3 encapsulation on the BUM packet to obtain an NVO3 packet, and forwards the NVO3 packet to another local NVE, where a source IP address in an NVO3 header of the NVO3 packet is the shared VTEP IP address. In this way, an NVE that receives the NVO3 packet compares, according to a stored interface entry, the shared VTEP IP address with a VTEP IP address corresponding to an interface of the NVE for connecting to a CE, and forwards the BUM packet obtained by decapsulation to an interface whose corresponding VTEP IP address is different from the shared VTEP IP address and that is in a DF state, but does not forward the BUM packet obtained by decapsulation to an interface whose corresponding VTEP IP address is the same as the shared VTEP IP address, so that a loop can be prevented from being generated when local NVEs forward a BUM packet between each other.

Figure 6:
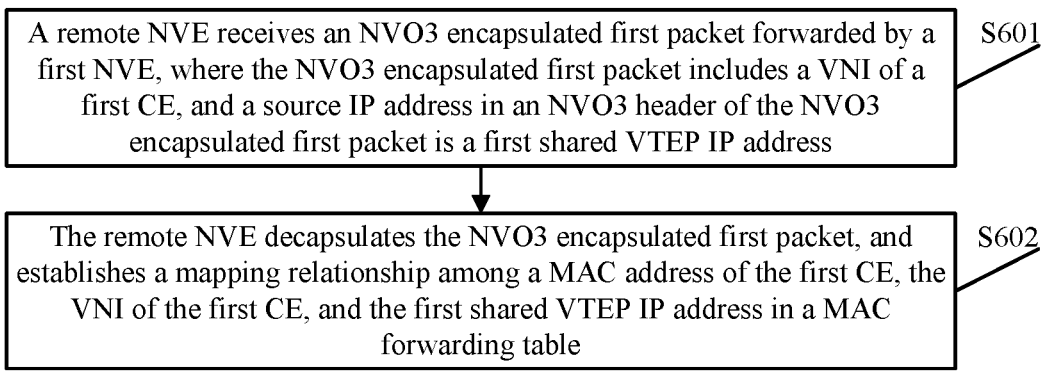
FIG. 6 is a schematic flowchart of still another packet processing method according to an embodiment of the present disclosure.

FIG. 6 is a schematic flowchart of still another packet processing method according to an embodiment of the present disclosure. The packet processing method described in this embodiment is applied to the NVO3 network architecture shown in FIG. 1. A first NVE and a second NVE serve as local NVEs, a first CE is multihomed to the first NVE and the second NVE, and the first NVE and the second NVE share a first shared VTEP IP address. The packet processing method includes the following steps:

S601. A remote NVE receives an NVO3 encapsulated first packet forwarded by the first NVE, where the NVO3 encapsulated first packet includes a VNI of the first CE, a source IP address in an NVO3 header of the NVO3 encapsulated first packet is the first shared VTEP IP address, the first packet is sent to the first NVE by the first CE, the first packet includes a MAC address of the first CE and a VLAN ID, and the VNI of the first CE is determined by the first NVE according to an inbound interface of the first packet and the VLAN ID.

S602. The remote NVE decapsulates the NVO3 encapsulated first packet, and establishes a mapping relationship among the MAC address of the first CE, the VNI of the first CE, and the first shared VTEP IP address in a MAC forwarding table.

Specifically, the first CE selects a link between the first CE and the first NVE as a transmit link, and when the first packet is a known unicast packet, and an outbound interface corresponding to the first packet is not a local interface, or when the first packet is a BUM packet, the first NVE performs NVO3 encapsulation on the first packet to obtain an NVO3 packet, and forwards the NVO3 packet to the remote NVE. A source IP address in an NVO3 header of the NVO3 packet is the first shared VTEP IP address. The remote NVE decapsulates the NVO3 packet to obtain the MAC address of the first CE, the VNI of the first CE, and the first shared VTEP IP address, and establishes the mapping relationship among the MAC address of the first CE, the VNI of the first CE, and the first shared VTEP IP address in the MAC forwarding table, so that the remote NVE completes learning of the MAC address of the first CE in a data plane.

Further, if the first CE selects a link between the first CE and the second NVE as a transmit link, the second NVE receives the first packet. Likewise, when the outbound interface is not a local interface, or when the second NVE determines that the first packet is a BUM packet, the second NVE performs NVO3 encapsulation on the first packet to obtain an NVO3 packet. A source IP address in an NVO3 header of the NVO3 packet is the first shared VTEP IP address shared by the first NVE and the second NVE. When the first CE sends a packet by using the second NVE, the remote NVE also establishes the mapping relationship among the MAC address of the first CE, the VNI of the first CE, and the first shared VTEP IP address in the MAC forwarding table, and the remote NVE may not perceive that the first CE is multihomed to different NVEs. Therefore, when a fault occurs in a multihomed link of the first CE, the remote NVE does not need to modify the MAC forwarding table, and the MAC address of the first CE does not jump on the remote NVE.

In some feasible implementations, when receiving a unicast packet sent to the first CE by a CE that is connected to the remote NVE, the remote NVE looks up the MAC forwarding table and then determines that the MAC address of the first CE corresponds to the first shared VTEP IP address. In this case, the remote NVE performs NVO3 encapsulation on the unicast packet, and sets a destination IP address in an NVO3 header of an NVO3 encapsulated unicast packet to the first shared VTEP IP address. Further, after an ECMP operation is performed, one of the first NVE and the second NVE that share the first shared VTEP IP address receives the NVO3 encapsulated unicast packet, and forwards the unicast packet to the first CE after decapsulation.

In this embodiment of the present disclosure, a remote NVE receives a packet sent by a CE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

Figure 7:
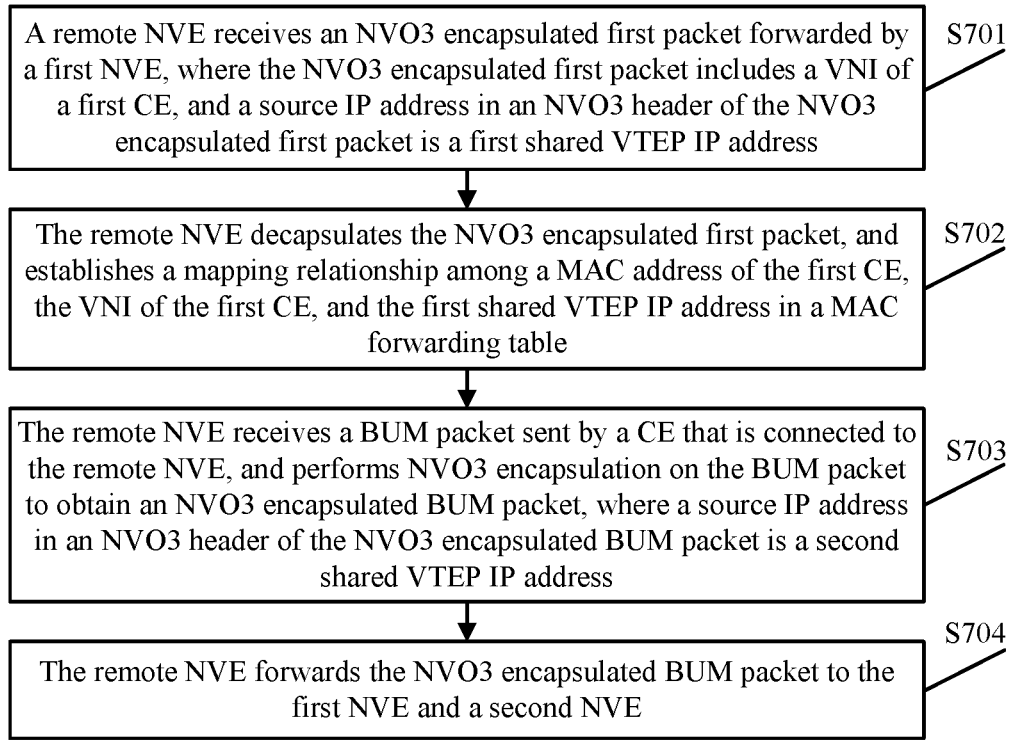
FIG. 7 is a schematic flowchart of yet another packet processing method according to an embodiment of the present disclosure.

FIG. 7 is a schematic flowchart of yet another packet processing method according to an embodiment of the present disclosure. The packet processing method described in this embodiment is applied to the NVO3 network architecture shown in FIG. 1. A first NVE and a second NVE serve as local NVEs, a first CE is multihomed to the first NVE and the second NVE, the first NVE and the second NVE share a first shared VTEP IP address, and a remote NVE and the second NVE share a second shared VTEP IP address. The packet processing method includes the following steps:

Step S701 and step S702 are the same as step S601 and step S602 in the foregoing embodiment, and details are not described herein again in this embodiment of the present disclosure.

S703. The remote NVE receives a BUM packet sent by a CE that is connected to the remote NVE, and performs NVO3 encapsulation on the BUM packet to obtain an NVO3 encapsulated BUM packet, where a source IP address in an NVO3 header of the NVO3 encapsulated BUM packet is the second shared VTEP IP address.

S704. The remote NVE forwards the NVO3 encapsulated BUM packet to the first NVE and the second NVE, where the NVO3 encapsulated BUM packet is used to instruct an NVE that receives the NVO3 encapsulated BUM packet to compare, according to a stored interface entry, the second shared VTEP IP address with a VTEP IP address corresponding to an interface of the NVE for connecting to a CE, and forward the BUM packet obtained by decapsulation to a first interface, but not forward the BUM packet obtained by decapsulation to a second interface, where a VTEP IP address corresponding to the first interface is different from the second shared VTEP IP address, the first interface is in a DF state, and a VTEP IP address corresponding to the second interface is the same as the second shared VTEP IP address.

Specifically, when receiving the BUM packet sent by the local side of the remote NVE, the remote NVE performs NVO3 encapsulation on the BUM packet to obtain the NVO3 encapsulated BUM packet, and separately forwards the NVO3 encapsulated BUM packet to the first NVE and the second NVE. The source IP address in the NVO3 header of the NVO3 encapsulated BUM packet is the second shared VTEP IP address, and destination IP addresses in the NVO3 header of the NVO3 encapsulated BUM packet are respectively globally unique VTEP IP addresses of the first NVE and the second NVE. After receiving the NVO3 encapsulated BUM packet, the first NVE and the second NVE respectively compare, according to stored interface entries, the second shared VTEP IP address with VTEP IP addresses corresponding to respective interfaces of the first NVE and the second NVE for connecting to CEs, and forward the BUM packet obtained by decapsulation to an interface whose corresponding VTEP IP address is different from the second shared VTEP IP address and that is in a DF state, but do not forward the BUM packet obtained by decapsulation to an interface whose corresponding VTEP IP address is the same as the second shared VTEP IP address.

In this embodiment of the present disclosure, a remote NVE receives a packet sent by a CE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

Further, the remote NVE forwards the NVO3 encapsulated BUM packet to the multiple local NVEs, so that a local NVE that receives the NVO3 encapsulated BUM packet compares, according to a stored interface entry, a shared VTEP IP address of the remote NVE with a VTEP IP address corresponding to an interface of the local NVE for connecting to a CE, and forwards the BUM packet obtained by decapsulation to an interface whose corresponding VTEP IP address is different from the shared VTEP IP address of the remote NVE and that is in a DF state, but does not forward the BUM packet obtained by decapsulation to an interface whose corresponding VTEP IP address is the same as the shared VTEP IP address of the remote NVE. The BUM packet forwarded by the remote NVE is forwarded by only one of the multiple local NVEs to a local CE, thereby preventing a CE that is connected to the local NVE from repeatedly receiving the BUM packet forwarded by the remote NVE.

Figure 8:
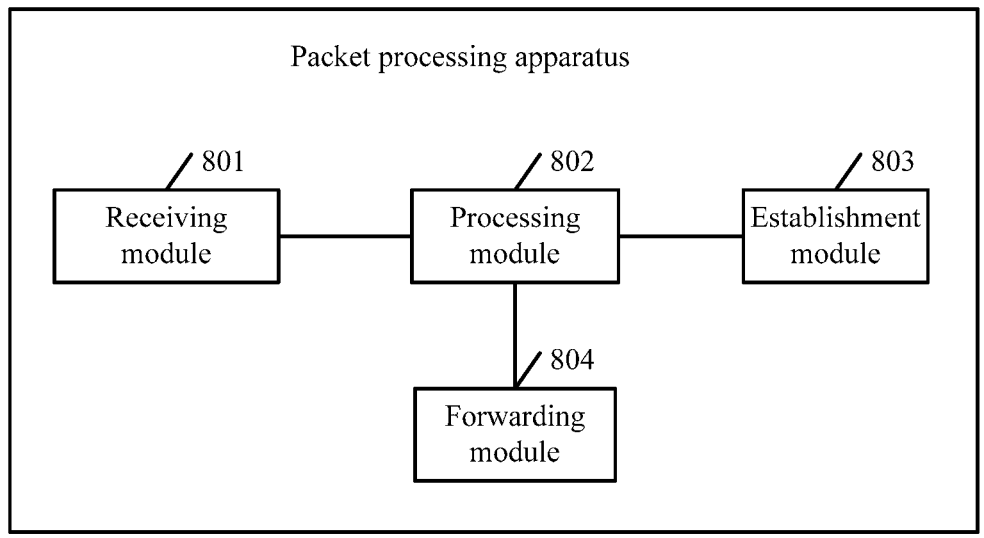
FIG. 8 is a schematic structural diagram of another packet processing apparatus according to an embodiment of the present disclosure.

FIG. 8 is a schematic structural diagram of another packet processing apparatus according to an embodiment of the present disclosure. The packet processing apparatus described in this embodiment is applied to the NVO3 network architecture shown in FIG. 1. The packet processing apparatus serves as a remote NVE, a first NVE and a second NVE serve as local NVEs, a first CE is multihomed to the first NVE and the second NVE, and the first NVE and the second NVE share a first shared VTEP IP address. The packet processing apparatus includes:

a receiving module 801, configured to receive an NVO3 encapsulated first packet forwarded by the first NVE, where the NVO3 encapsulated first packet includes a VNI of the first CE, a source IP address in an NVO3 header of the NVO3 encapsulated first packet is the first shared VTEP IP address, the first packet is sent to the first NVE by the first CE, the first packet includes a MAC address of the first CE and a VLAN ID, and the VNI of the first CE is determined by the first NVE according to an inbound interface of the first packet and the VLAN ID;

a processing module 802, configured to decapsulate the NVO3 encapsulated first packet; and an establishment module 803, configured to establish a mapping relationship among the MAC address of the first CE, the VNI of the first CE, and the first shared VTEP IP address in a MAC forwarding table.

Specifically, the processing module 802 decapsulates the NVO3 encapsulated first packet received by the receiving module 801 to obtain the MAC address of the first CE, the VNI of the first CE, and the first shared VTEP IP address. The establishment module 803 establishes the mapping relationship among the MAC address of the first CE, the VNI of the first CE, and the first shared VTEP IP address in the MAC forwarding table, so that the packet processing apparatus (that is, the remote NVE) completes learning of the MAC address of the first CE in a data plane.

In this embodiment of the present disclosure, a remote NVE receives a packet sent by a CE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

In some feasible implementations, the packet processing apparatus and the second NVE share a second shared VTEP IP address.

The receiving module 801 is further configured to receive a BUM packet sent by a CE that is connected to the packet processing apparatus.

The processing module 802 is further configured to perform NVO3 encapsulation on the BUM packet to obtain an NVO3 encapsulated BUM packet, where a source IP address in an NVO3 header of the NVO3 encapsulated BUM packet is the second shared VTEP IP address.

The packet processing apparatus further includes:

a forwarding module 804, configured to forward the NVO3 encapsulated BUM packet to the first NVE and the second NVE, where the NVO3 encapsulated BUM packet is used to instruct an NVE that receives the NVO3 encapsulated BUM packet to compare, according to a stored interface entry, the second shared VTEP IP address with a VTEP IP address corresponding to an interface of the NVE for connecting to a CE, and forward the BUM packet obtained by decapsulation to a first interface, but not forward the BUM packet obtained by decapsulation to a second interface, where a VTEP IP address corresponding to the first interface is different from the second shared VTEP IP address, the first interface is in a DF state, and a VTEP IP address corresponding to the second interface is the same as the second shared VTEP IP address.

Specifically, when the receiving module 801 receives the BUM packet sent by the local side of the packet processing apparatus, the processing module 802 performs NVO3 encapsulation on the BUM packet to obtain the NVO3 encapsulated BUM packet, and the forwarding module 804 separately forwards the NVO3 encapsulated BUM packet to the first NVE and the second NVE. The source IP address in the NVO3 header of the NVO3 encapsulated BUM packet is the second shared VTEP IP address, and destination IP addresses in the NVO3 header of the NVO3 encapsulated BUM packet are respectively globally unique VTEP IP addresses of the first NVE and the second NVE. After receiving the NVO3 encapsulated BUM packet, the first NVE and the second NVE respectively compare, according to stored interface entries, the second shared VTEP IP address with VTEP IP addresses corresponding to respective interfaces of the first NVE and the second NVE for connecting to CEs, and forward the BUM packet obtained by decapsulation to an interface whose corresponding VTEP IP address is different from the second shared VTEP IP address and that is in a DF state, but do not forward the BUM packet obtained by decapsulation to an interface whose corresponding VTEP IP address is the same as the second shared VTEP IP address.

In this embodiment of the present disclosure, the remote NVE forwards the NVO3 encapsulated BUM packet to the multiple local NVEs, so that a local NVE that receives the NVO3 encapsulated BUM packet compares, according to a stored interface entry, a shared VTEP IP address of the remote NVE with a VTEP IP address corresponding to an interface of the local NVE for connecting to a CE, and forwards the BUM packet obtained by decapsulation to an interface whose corresponding VTEP IP address is different from the shared VTEP IP address of the remote NVE and that is in a DF state, but does not forward the BUM packet obtained by decapsulation to an interface whose corresponding VTEP IP address is the same as the shared VTEP IP address of the remote NVE. The BUM packet forwarded by the remote NVE is forwarded by only one of the multiple local NVEs to a local CE, thereby preventing a CE that is connected to the local NVE from repeatedly receiving the BUM packet forwarded by the remote NVE.

Figure 9:
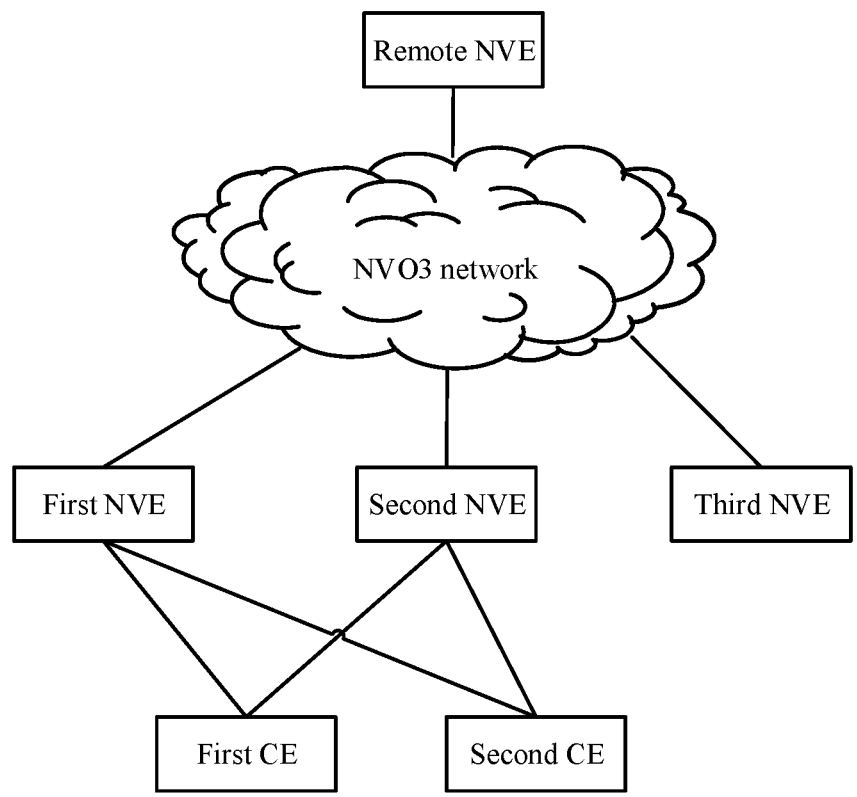
FIG. 9 is a schematic structural diagram of an NVO3 network system according to an embodiment of the present disclosure.

FIG. 9 is a schematic structural diagram of an NVO3 network system according to an embodiment of the present disclosure. The NVO3 network system described in this embodiment includes a first CE, a second CE, a first NVE, a second NVE, a third NVE, and a remote NVE. The first NVE, the second NVE, and the third NVE serve as local NVEs, the first CE and the second CE are both multihomed to the first NVE and the second NVE, the first NVE and the second NVE share a first shared VTEP IP address, and the second NVE and the third NVE share a second shared VTEP IP address.

The first NVE is configured to receive a first packet sent by the first CE, where the first packet includes a MAC address of the first CE and a VLAN ID.

The first NVE is further configured to: determine a VNI of the first CE according to an inbound interface of the first packet and the VLAN ID, and perform NVO3 encapsulation on the first packet to obtain an NVO3 encapsulated first packet, where the NVO3 encapsulated first packet includes the VNI of the first CE, and a source IP address in an NVO3 header of the NVO3 encapsulated first packet is the first shared VTEP IP address.

The first NVE is further configured to forward the NVO3 encapsulated first packet to the remote NVE.

The remote NVE is configured to: decapsulate the received NVO3 encapsulated first packet, and establish a mapping relationship among the MAC address of the first CE, the VNI of the first CE, and the first shared VTEP IP address in a MAC forwarding table.

Further, the first NVE is further configured to receive a second packet sent by the first CE, where the second packet is a BUM packet.

The first NVE is further configured to: replicate the second packet, perform NVO3 encapsulation on the second packet to obtain an NVO3 encapsulated second packet, and forward the NVO3 encapsulated second packet to the second NVE and the third NVE, where a source IP address in an NVO3 header of the NVO3 encapsulated second packet is the first shared VTEP IP address.

The second NVE is configured to: after receiving the NVO3 encapsulated second packet, compare, according to a stored interface entry, the first shared VTEP IP address with a VTEP IP address corresponding to an interface of the second NVE for connecting to a CE, and forward the second packet obtained by decapsulation to a first interface, but not forward the second packet obtained by decapsulation to a second interface, where a VTEP IP address corresponding to the first interface is different from the first shared VTEP IP address, the first interface is in a DF state, and a VTEP IP address corresponding to the second interface is the same as the first shared VTEP IP address.

The third NVE is configured to: after receiving the NVO3 encapsulated second packet, compare, according to a stored interface entry, the first shared VTEP IP address with a VTEP IP address corresponding to an interface of the third NVE for connecting to a CE, and forward the second packet obtained by decapsulation to a third interface, but not forward the second packet obtained by decapsulation to a fourth interface, where a VTEP IP address corresponding to the third interface is different from the first shared VTEP IP address, the third interface is in a DF state, and a VTEP IP address corresponding to the fourth interface is the same as the first shared VTEP IP address.

Each interface entry includes an interface for connecting to a CE, a VTEP IP address corresponding to the interface, and a status of the interface, the status includes a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

Further, if the first NVE is further connected to the second CE, and a VTEP IP address corresponding to an interface for connecting to the second CE is the first shared VTEP IP address, the first NVE is further configured to replicate the second packet and forward the second packet to the second CE.

In this embodiment of the present disclosure, a CE sends a packet to a remote NVE by using any one of multiple local NVEs to which the CE is multihomed, and when performing NVO3 encapsulation on the packet, the any local NVE uses, as a source IP address in an NVO3 header, a shared VTEP IP address shared by the multiple local NVEs, so that the remote NVE establishes a mapping relationship among a MAC address of the CE, a VNI of the CE, and the shared VTEP IP address in a MAC forwarding table. Because the remote NVE can receive only one IP address corresponding to the CE, the remote NVE does not perceive multihoming of the CE, the MAC address of the CE does not jump on the remote NVE, and the remote NVE does not need to modify the MAC forwarding table when a fault occurs in a multihomed link of the CE. In this way, a burden on the remote NVE of maintaining the MAC forwarding table is greatly reduced, and network scalability is enhanced.

Further, for a BUM packet sent by a local CE and received by a local NVE, when the local NVE is further connected to a CE that corresponds to a same shared VTEP IP address as the local CE, the local NVE directly forwards the BUM packet to the CE, performs NVO3 encapsulation on the BUM packet to obtain an NVO3 packet, and forwards the NVO3 packet to another local NVE, where a source IP address in an NVO3 header of the NVO3 packet is the shared VTEP IP address. In this way, an NVE that receives the NVO3 packet compares, according to a stored interface entry, the shared VTEP IP address with a VTEP IP address corresponding to an interface of the NVE for connecting to a CE, and forwards the BUM packet obtained by decapsulation to an interface whose corresponding VTEP IP address is different from the shared VTEP IP address and that is in a DF state, but does not forward the BUM packet obtained by decapsulation to an interface whose corresponding VTEP IP address is the same as the shared VTEP IP address, so that a loop can be prevented from being generated when local NVEs forward a BUM packet between each other.

Figure 10:
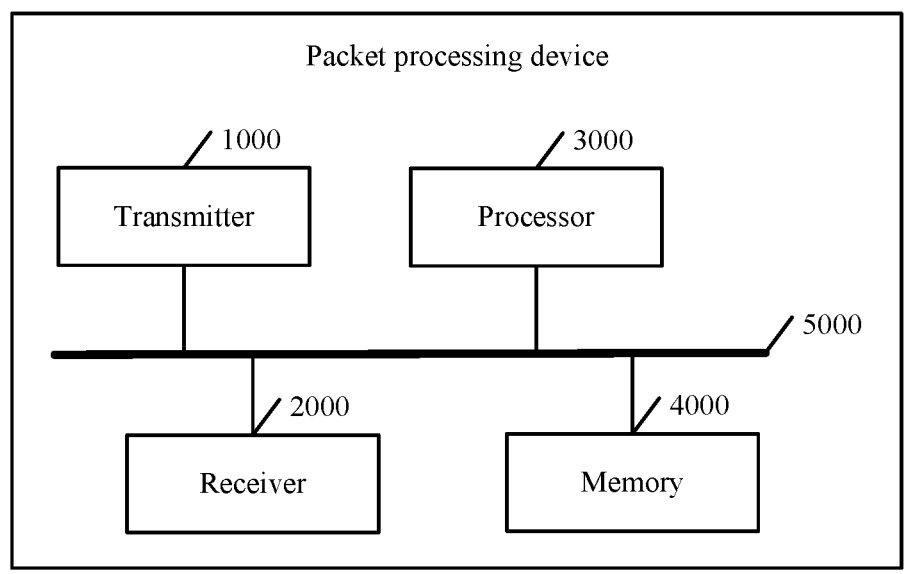
FIG. 10 is a schematic structural diagram of a packet processing device according to an embodiment of the present disclosure.

FIG. 10 is a schematic structural diagram of a packet processing device according to an embodiment of the present disclosure. The packet processing device described in this embodiment includes a transmitter 1000, a receiver 2000, a processor 3000, and a memory 4000. The transmitter 1000, the receiver 2000, the processor 3000, and the memory 4000 may be connected by using a bus 5000, or may be connected in another manner. The memory 4000 may store program code. The processor 3000 can invoke the program code in the memory 4000 to perform a corresponding operation. The packet processing device may be applied to the NVO3 network architecture shown in FIG. 1. The packet processing device serves as a first NVE, the first NVE and a second NVE serve as local NVEs, a first CE is multihomed to the first NVE and the second NVE, and the first NVE and the second NVE share a first shared VTEP IP address.

The receiver 2000 is configured to receive a first packet sent by the first CE, where the first packet includes a MAC address of the first CE and a VLAN ID.

The processor 3000 is configured to determine a VNI of the first CE according to an inbound interface of the first packet and the VLAN ID.

The processor 3000 is further configured to perform NVO3 encapsulation on the first packet to obtain an NVO3 encapsulated first packet, where the NVO3 encapsulated first packet includes the VNI of the first CE, and a source IP address in an NVO3 header of the NVO3 encapsulated first packet is the first shared VTEP IP address.

The transmitter 1000 is configured to forward the NVO3 encapsulated first packet to the remote NVE, where the NVO3 encapsulated first packet is used to instruct the remote NVE to establish a mapping relationship among the MAC address of the first CE, the VNI of the first CE, and the first shared VTEP IP address in a MAC forwarding table.

In some feasible implementations, the NVO3 network system further includes a third NVE, where the second NVE and the third NVE share a second shared VTEP IP address.

The receiver 2000 is further configured to receive a second packet sent by the first CE.

The processor 3000 is further configured to: when the second packet is a BUM packet, replicate the second packet, and perform NVO3 encapsulation on the second packet to obtain an NVO3 encapsulated second packet.

The transmitter 1000 is further configured to forward the NVO3 encapsulated second packet to the second NVE and the third NVE.

A source IP address in an NVO3 header of the NVO3 encapsulated second packet is the first shared VTEP IP address, and the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to a first interface, but not forward the second packet obtained by decapsulation to a second interface. A VTEP IP address corresponding to the first interface is different from the first shared VTEP IP address, the first interface is in a designated forwarder DF state, and a VTEP IP address corresponding to the second interface is the same as the first shared VTEP IP address.

In some feasible implementations, the transmitter 1000 is further configured to forward the replicated second packet to a second CE when the second packet is the BUM packet, the packet processing device is further connected to the second CE, and a VTEP IP address corresponding to an interface for connecting to the second CE is the first shared VTEP IP address.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disc, an optical disc, a read-only memory (ROM), or a random access memory (RAM).

The packet processing method, the related apparatus, and the NVO3 network system provided in the embodiments of the present disclosure are described in detail above. The principles and implementations of the present disclosure are described herein by using specific examples. The description about the embodiments is merely provided to help understand the method and core ideas of the present disclosure. In addition, a person of ordinary skill in the art can make variations and modifications to the present disclosure in terms of the specific implementations and application scopes according to the ideas of the present disclosure. In conclusion, the content of the specification shall not be construed as a limit to the present disclosure.

What is claimed is:

1. A packet processing method, applied to a network virtualization over layer 3 (NVO3) network system, wherein the NVO3 network system comprises a first network virtualization edge (NVE), a second NVE, a remote NVE, and a first customer edge (CE), the first CE is multihomed to the first NVE and the second NVE, and the first NVE and the second NVE share a first shared Virtual Extensible LAN (VXLAN) tunnel end point (VTEP) Internet Protocol (IP) address, the method comprising:
   receiving, by the first NVE, a first packet sent by the first CE, wherein the first packet comprises a media access control (MAC) address of the first CE and a virtual local area network identifier (VLAN ID);
   determining, by the first NVE, a VXLAN network identifier (VNI) of the first CE according to an inbound interface of the first packet and the VLAN ID;
   performing, by the first NVE, NVO3 encapsulation on the first packet to obtain an NVO3 encapsulated first packet, wherein the NVO3 encapsulated first packet comprises the VNI of the first CE, and a source IP address in an NVO3 header of the NVO3 encapsulated first packet is the first shared VTEP IP address; and
   forwarding, by the first NVE, the NVO3 encapsulated first packet to the remote NVE, wherein the NVO3 encapsulated first packet is used to instruct the remote NVE to establish a mapping relationship among the MAC address of the first CE, the VNI of the first CE, and the first shared VTEP IP address in a MAC forwarding table.

2. The method according to claim 1, wherein the NVO3 network system further comprises a third NVE, the method further comprising:
   receiving, by the first NVE, a second packet sent by the first CE, wherein the second packet is a broadcast, unknown unicast, and multicast (BUM) packet;
   replicating, by the first NVE, the second packet;
   performing NVO3 encapsulation on the second packet to obtain an NVO3 encapsulated second packet; and
   forwarding the NVO3 encapsulated second packet to the second NVE and the third NVE, wherein a source IP address in an NVO3 header of the NVO3 encapsulated second packet is the first shared VTEP IP address, and the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to a first interface, but not forward the second packet obtained by decapsulation to a second interface, wherein a VTEP IP address corresponding to the first interface is different from the first shared VTEP IP address, the first interface is in a designated forwarder DF state, and a VTEP IP address corresponding to the second interface is the same as the first shared VTEP IP address;

wherein each interface entry comprises an interface for connecting to a CE, a VTEP IP address corresponding to the interface, and a status of the interface, the status comprises a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

3. The method according to claim 2, wherein the first NVE is further connected to a second CE, and a VTEP IP address corresponding to an interface for connecting to the second CE is the first shared VTEP IP address, the method further comprising:

forwarding, by the first NVE, the replicated second packet to the second CE.

4. A packet processing apparatus, applied to a network virtualization over layer 3 (NVO3) network system, wherein the NVO3 network system comprises the packet processing apparatus which is a first network virtualization edge (NVE), a second NVE, a remote NVE, and a first customer edge (CE), the first CE is multihomed to the packet processing apparatus and the second NVE, and the packet processing apparatus and the second NVE share a first shared Virtual Extensible LAN (VXLAN) tunnel end point (VTEP) Internet Protocol (IP) address, the apparatus comprising:

a non-transitory memory configured to store program instructions;

a processor configured to execute the program instructions to enable the packet processing apparatus to:

receive a first packet sent by the first CE, wherein the first packet comprises a media access control (MAC) address of the first CE and a virtual local area network identifier (VLAN ID);

determine a VXLAN network identifier (VNI) of the first CE according to an inbound interface of the first packet and the VLAN ID;

perform NVO3 encapsulation on the first packet to obtain an NVO3 encapsulated first packet, wherein the NVO3 encapsulated first packet comprises the VNI of the first CE, and a source IP address in an NVO3 header of the NVO3 encapsulated first packet is the first shared VTEP IP address; and forward the NVO3 encapsulated first packet to the remote NVE, wherein the NVO3 encapsulated first packet is used to instruct the remote NVE to establish a mapping relationship among the MAC address of the first CE, the VNI of the first CE, and the first shared VTEP IP address in a MAC forwarding table.

5. The apparatus according to claim 4, wherein the NVO3 network system further comprises a third NVE;

the processor is further configured to execute the program instructions to enable the packet processing apparatus to:

receive a second packet sent by the first CE, wherein the second packet is a broadcast, unknown unicast, and multicast (BUM) packet;

replicate the second packet, and perform NVO3 encapsulation on the second packet to obtain an NVO3 encapsulated second packet; and forward the NVO3 encapsulated second packet to the second NVE and the third NVE, wherein a source IP address in an NVO3 header of the NVO3 encapsulated second packet is the first shared VTEP IP address, and the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE, and forward the second packet obtained by decapsulation to a first interface, but not forward the second packet obtained by decapsulation to a second interface, wherein a VTEP IP address corresponding to the first interface is different from the first shared VTEP IP address, the first interface is in a DF state, and a VTEP IP address corresponding to the second interface is the same as the first shared VTEP IP address;

wherein each interface entry comprises an interface for connecting to a CE, a VTEP IP address corresponding to the interface, and a status of the interface, the status comprises a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

6. The apparatus according to claim 5, wherein the processor is further configured to execute the program instructions to enable the packet processing apparatus to:

forward the replicated second packet to a second CE when the packet processing apparatus is further connected to the second CE, and a VTEP IP address corresponding to an interface for connecting to the second CE is the first shared VTEP IP address.

7. A packet processing method, wherein the method is applied to a network virtualization over layer 3 (NVO3) network system, the NVO3 network system comprises a first network virtualization edge (NVE), a second NVE, a remote NVE, and a first customer edge (CE), the first CE is multihomed to the first NVE and the second NVE, and the first NVE and the second NVE share a first shared Virtual Extensible LAN (VXLAN) tunnel end point (VTEP) Internet Protocol (IP) address, the method comprising:

receiving, by the remote NVE, an NVO3 encapsulated first packet forwarded by the first NVE, wherein the NVO3 encapsulated first packet comprises a VXLAN network identifier (VNI) of the first CE, a source IP address in an NVO3 header of the NVO3 encapsulated first packet is the first shared VTEP IP address, the NVO3 encapsulated first packet is obtained by performing NVO3 encapsulation on a first packet, the first packet is sent to the first NVE by the first CE, the first packet comprises a media access control (MAC)

address of the first CE and a virtual local area network identifier (VLAN ID), and the VNI of the first CE is determined by the first NVE according to an inbound interface of the first packet and the VLAN ID; and decapsulating, by the remote NVE, the NVO3 encapsulated first packet, and establishing a mapping relationship among the MAC address of the first CE, the VNI of the first CE, and the first shared VTEP IP address in a MAC forwarding table.

8. The method according to claim 7, wherein the remote NVE and the second NVE share a second shared VTEP IP address, the method further comprising:

receiving, by the remote NVE, a broadcast, unknown unicast, and multicast (BUM) packet sent by a CE that is connected to the remote NVE, and performing NVO3 encapsulation on the BUM packet to obtain an NVO3 encapsulated BUM packet, wherein a source IP address in an NVO3 header of the NVO3 encapsulated BUM packet is the second shared VTEP IP address; and forwarding, by the remote NVE, the NVO3 encapsulated BUM packet to the first NVE and the second NVE, wherein the NVO3 encapsulated BUM packet is used to instruct an NVE that receives the NVO3 encapsulated BUM packet to compare, according to a stored interface entry, the second shared VTEP IP address with a VTEP IP address corresponding to an interface of the NVE for connecting to a CE, and forward the BUM packet obtained by decapsulation to a first interface, but not forward the BUM packet obtained by decapsulation to a second interface, wherein a VTEP IP address corresponding to the first interface is different from the second shared VTEP IP address, the first interface is in a DF state, and a VTEP IP address corresponding to the second interface is the same as the second shared VTEP IP address;

wherein each interface entry comprises an interface for connecting to a CE, a VTEP IP address corresponding to the interface, and a status of the interface, the status comprises a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

9. A packet processing apparatus, applied to a network virtualization over layer 3 (NVO3) network system, wherein the NVO3 network system comprises a first network virtualization edge (NVE), a second NVE, the packet processing apparatus, and a first customer edge (CE), the first CE is multihomed to the first NVE and the second NVE, and the first NVE and the second NVE share a first shared Virtual Extensible LAN (VXLAN) tunnel end point (VTEP) Internet Protocol (IP) address, the apparatus comprising:

a non-transitory memory configured to store program instructions;

a processor configured to execute the program instructions to enable the packet processing apparatus to:

receive an NVO3 encapsulated first packet forwarded by the first NVE, wherein the NVO3 encapsulated first packet comprises a VXLAN network identifier (VNI) of the first CE, a source IP address in an NVO3 header of the NVO3 encapsulated first packet is the first shared VTEP IP address, the first packet is sent to the first NVE by the first CE, the NVO3 encapsulated first packet is obtained by performing NVO3 encapsulation on a first packet, the first packet comprises a media access control (MAC) address of the first CE and a virtual local area network identifier (VLAN ID), and the VNI of the first CE is determined by the first NVE according to an inbound interface of the first packet and the VLAN ID;

decapsulate the NVO3 encapsulated first packet; and establish a mapping relationship among the MAC address of the first CE, the VNI of the first CE, and the first shared VTEP IP address in a MAC forwarding table.

10. The apparatus according to claim 9, wherein the packet processing apparatus and the second NVE share a second shared VTEP IP address; and the processor is further configured to execute the program instructions to enable the packet processing apparatus to:

receive a broadcast, unknown unicast, and multicast (BUM) packet sent by a CE that is connected to the packet processing apparatus;

perform NVO3 encapsulation on the BUM packet to obtain an NVO3 encapsulated BUM packet, wherein a source IP address in an NVO3 header of the NVO3 encapsulated BUM packet is the second shared VTEP IP address; and forward the NVO3 encapsulated BUM packet to the first NVE and the second NVE, wherein the NVO3 encapsulated BUM packet is used to instruct an NVE that receives the NVO3 encapsulated BUM packet to compare, according to a stored interface entry, the second shared VTEP IP address with a VTEP IP address corresponding to an interface of the NVE for connecting to a CE, and forward the BUM packet obtained by decapsulation to a first interface, but not forward the BUM packet obtained by decapsulation to a second interface, wherein a VTEP IP address corresponding to the first interface is different from the second shared VTEP IP address, the first interface is in a DF state, and a VTEP IP address corresponding to the second interface is the same as the second shared VTEP IP address;

wherein each interface entry comprises an interface for connecting to a CE, a VTEP IP address corresponding to the interface, and a status of the interface, the status comprises a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

11. A network virtualization over layer 3 (NVO3) network system, the system comprising:

a first network virtualization edge (NVE);

a second NVE;

a remote NVE; and a first customer edge (CE), the first CE is multihomed to the first NVE and the second NVE, and the first NVE and the second NVE share a first shared Virtual Extensible LAN (VXLAN) tunnel end point (VTEP) Internet Protocol (IP) address;

wherein, the first NVE is configured to receive a first packet sent by the first CE, wherein the first packet comprises a media access control (MAC) address of the first CE and a virtual local area network identifier (VLAN ID);

the first NVE is further configured to: determine a VXLAN network identifier (VNI) of the first CE according to an inbound interface of the first packet and the VLAN ID, and perform NVO3 encapsulation on the first packet to obtain an NVO3 encapsulated first packet, wherein the NVO3 encapsulated first packet comprises the VNI of the first CE, and a source IP address in an NVO3 header of the NVO3 encapsulated first packet is the first shared VTEP IP address;

the first NVE is further configured to forward the NVO3 encapsulated first packet to the remote NVE; and the remote NVE is configured to: decapsulate the received NVO3 encapsulated first packet, and establish a mapping relationship among the MAC address of the first CE, the VNI of the first CE, and the first shared VTEP IP address in a MAC forwarding table.

12. The system according to claim 11, wherein the system further comprises a third NVE;

Wherein the first NVE is further configured to receive a second packet sent by the first CE, wherein the second packet is a broadcast, unknown unicast, and multicast (BUM) packet;

the first NVE is further configured to: replicate the second packet, perform NVO3 encapsulation on the second packet to obtain an NVO3 encapsulated second packet, and forward the NVO3 encapsulated second packet to the second NVE and the third NVE, wherein a source IP address in an NVO3 header of the NVO3 encapsulated second packet is the first shared VTEP IP address;

the second NVE is configured to: after receiving the NVO3 encapsulated second packet, compare, according to a stored interface entry, the first shared VTEP IP address with a VTEP IP address corresponding to an interface of the second NVE for connecting to a CE, and forward the second packet obtained by decapsulation to a first interface, but not forward the second packet obtained by decapsulation to a second interface, wherein a VTEP IP address corresponding to the first interface is different from the first shared VTEP IP address, the first interface is in a DF state, and a VTEP IP address corresponding to the second interface is the same as the first shared VTEP IP address; and the third NVE is configured to: after receiving the NVO3 encapsulated second packet, compare, according to a stored interface entry, the first shared VTEP IP address with a VTEP IP address corresponding to an interface of the third NVE for connecting to a CE, and forward the second packet obtained by decapsulation to a third interface, but not forward the second packet obtained by decapsulation to a fourth interface, wherein a VTEP IP address corresponding to the third interface is different from the first shared VTEP IP address, the third interface is in a DF state, and a VTEP IP address corresponding to the fourth interface is the same as the first shared VTEP IP address;

wherein each interface entry comprises an interface for connecting to a CE, a VTEP IP address corresponding to the interface, and a status of the interface, the status comprises a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

13. The system according to claim 12, wherein the first NVE is further configured to forward the replicated second packet to a second CE when the first NVE is further connected to the second CE, and a VTEP IP address corresponding to an interface for connecting to the second CE is the first shared VTEP IP address.

14. The method according to claim 1, wherein the NVO3 network system further comprises a third NVE, the method further comprising:

receiving, by the first NVE, a second packet sent by the first CE, wherein the second packet is a broadcast, unknown unicast, and multicast (BUM) packet;

replicating, by the first NVE, the second packet;

performing NVO3 encapsulation on the second packet to obtain an NVO3 encapsulated second packet; and forwarding the NVO3 encapsulated second packet to the second NVE and the third NVE, wherein a source IP address in an NVO3 header of the NVO3 encapsulated second packet is the first shared VTEP IP address, and the NVO3 encapsulated second packet is used to instruct an NVE that receives the NVO3 encapsulated second packet to compare, according to a stored interface entry, the first shared VTEP IP address with a VTEP IP address corresponding to an interface of the NVE for connecting to a CE.

15. The method accordingly to claim 14, wherein the NVO3 encapsulated second packet is used to further instruct the NVE that receives the NVO3 encapsulated second packet to forward the second packet obtained by decapsulation to a first interface, but not forward the second packet obtained by decapsulation to a second interface.

16. The method accordingly to claim 15, wherein a VTEP IP address corresponding to the first interface is different from the first shared VTEP IP address, the first interface is in a designated forwarder DF state, and a VTEP IP address corresponding to the second interface is the same as the first shared VTEP IP address.

17. The method accordingly to claim 14, wherein each interface entry comprises an interface for connecting to a CE, a VTEP IP address corresponding to the interface, and a status of the interface.

18. The method accordingly to claim 17, wherein the status comprises a DF state or a non-DF state, a VTEP IP address corresponding to an interface for connecting to a CE that is multihomed to multiple NVEs is a shared VTEP IP address of the NVEs to which the CE is multihomed, and a VTEP IP address corresponding to an interface for connecting to a CE that is single-homed to an NVE is a globally unique VTEP IP address of the NVE to which the CE is single-homed.

* * * * *